United States Patent [19]
Velan

[11] Patent Number: 4,580,763
[45] Date of Patent: Apr. 8, 1986

[54] SEAL-SEAT FOR USE IN BALL VALVES

[75] Inventor: Adolf K. Velan, Montreal, Canada

[73] Assignee: Velan, Inc., Quebec, Canada

[21] Appl. No.: 574,182

[22] Filed: Jan. 26, 1984

[51] Int. Cl.$^4$ ............................................. F16K 25/00
[52] U.S. Cl. ..................................... 251/171; 251/315
[58] Field of Search ............... 251/170, 171, 172, 315, 251/314

[56] References Cited

U.S. PATENT DOCUMENTS

| | | | |
|---|---|---|---|
| 3,030,068 | 4/1962 | Priese | 251/172 |
| 3,384,341 | 5/1968 | Ripert | 251/315 |
| 3,488,033 | 1/1970 | Priese | 251/172 |
| 3,547,403 | 12/1970 | Grauer | 251/315 |
| 3,940,107 | 2/1976 | Allenbaugh, Jr. | 251/315 |
| 4,285,642 | 8/1981 | Komhyr | 92/170 |
| 4,368,755 | 1/1983 | King | 137/843 |
| 4,418,887 | 12/1983 | Tubaro | 251/315 |

OTHER PUBLICATIONS

Velan, *Advanced Design Ball Valves with Memory Seal* 1984, p. 4.

Primary Examiner—Martin P. Schwadron
Assistant Examiner—Sheri M. Novack
Attorney, Agent, or Firm—Charles E. Brown; Charles A. Brown

[57] ABSTRACT

In a ball-type valve having a valve body and an annular seat therein for accommodating the ball, the improvement comprising adapting the seat whereby when the valve is in its open or closed position, the ball compresses the seat to seal the same against the valve body and at the same time tensions the seat to seal thereagainst. Also disclosed is a method of forming a seal between the body of a ball valve and the ball thereof, comprising the steps of providing a seat intermediate the body and the ball and moving the ball toward the body upon assembly of the valve whereby to compress a portion of the seat against the body and at the same time to tension a portion of the seat against the ball, thereby forming the seal between the body and the ball.

18 Claims, 3 Drawing Figures

SEAL-SEAT FOR USE IN BALL VALVES

BACKGROUND OF INVENTION (a) Field of Invention

The present invention relates to seal-seats for ball-type valves, the invention particularly relates to an improved seal-seat for use in ball valves operating at high pressures and at high temperatures, also such in combination with said ball values.

The invention still further relates to a method of forming a seal between the body of a ball valve and the ball thereof.

(b) Description of Prior Art

Seats with induced sealing in ball valves are known, as exemplified by applicant's own U.S. Pat. No. 3,384,341, dated May 21, 1968. Such provides automatic seat ball sealing in ball-type valves operating with low and medium pressures. Such known valves however do not operate satisfactorily at higher operating pressures, including for example 4,000 psi and with accompanying high temperatures.

SUMMARY OF INVENTION

It is therefore an important aim of the present invention to provide a system of automatic seat ball sealing, i.e., combination seat and seal, which will operate efficiently at said higher pressures and temperatures, including ones of 2 inch size capable of operating at 4,500 psi at 300° F. and 3,200 psi at 400° F.

The resilient seats in ball valves determine their quality of operation. Thus, the functional characteristics of the resilient seats have a profound impact on valve life, valve tightness and operating torque. Inherent difficulties with standard seats include (1) cold flow in the material comprising the seal caused by high compressive forces applied; (2) fatique of the material and consequent loss of sealing ability and (3) high friction and operating torques due to high seat compression.

With the resilient seats in accordance with the present invention: no cold flow occurs as sealing is achieved with relatively small compressive forces; little fatigue occurs as the sealing portion of the seat at the working area is under tensile forces; relatively low operating torque, including up to 50% less than with standard seats is achieved, due to a small effective contact face at the working area, all of which results in a relatively long service life and the seats remaining tight after many cycles. During experimentation, valves in accordance with the present invention remained tight after more than one million cycles.

In one aspect of the present invention there is provided an annular seal-seat for use in high pressure valve having a valve body and a ball, the seal-seat comprising a first working portion adapted to be received within a cavity in the valve body for use in mounting the seal seat the first working portion comprising a plurality of cavity engaging faces and a second working portion extending in cantilever fashion radially outwardly from the first portion and adapted to sealingly engage the ball whereby during the assembly of the valve to restrict fluid flow therethrough when the valve is in a closed position, the first portion is subjected to compression forces and the second portion is subjected to tensile forces.

In a further aspect of the present invention there is provided in a ball-type valve having a valve body and an annular seat therein for accommodating the ball, the improvement comprising adapting the seat whereby when the valve is in its open or closed position, the ball compresses the seat to seal the same against the valve body and at the same time tensions the seat to seal thereagainst.

In a further aspect of the present invention there is provided a method of forming a seal between the body of a ball valve and the ball thereof, comprising the steps of providing an annular seal seat intermediate said body and said ball, said annular seal seat comprising a first working portion having a plurality of cavity engaging faces and a second working portion extending in cantilever fashion radially outwardly from said first portion and adapted to sealingly engage said ball; and moving said ball toward said body upon assembly of the valve whereby to compress said first working portion and said plurality of cavity engaging faces against respective cavity faces in said valve body, and whereby to tension said second working portion against said ball thereby forming said seal between said body and said ball.

DESCRIPTION OF PREFERRED EMBODIMENTS

The invention is illustrated by way of example in the accompanying drawings, wherein.

Figure 1:
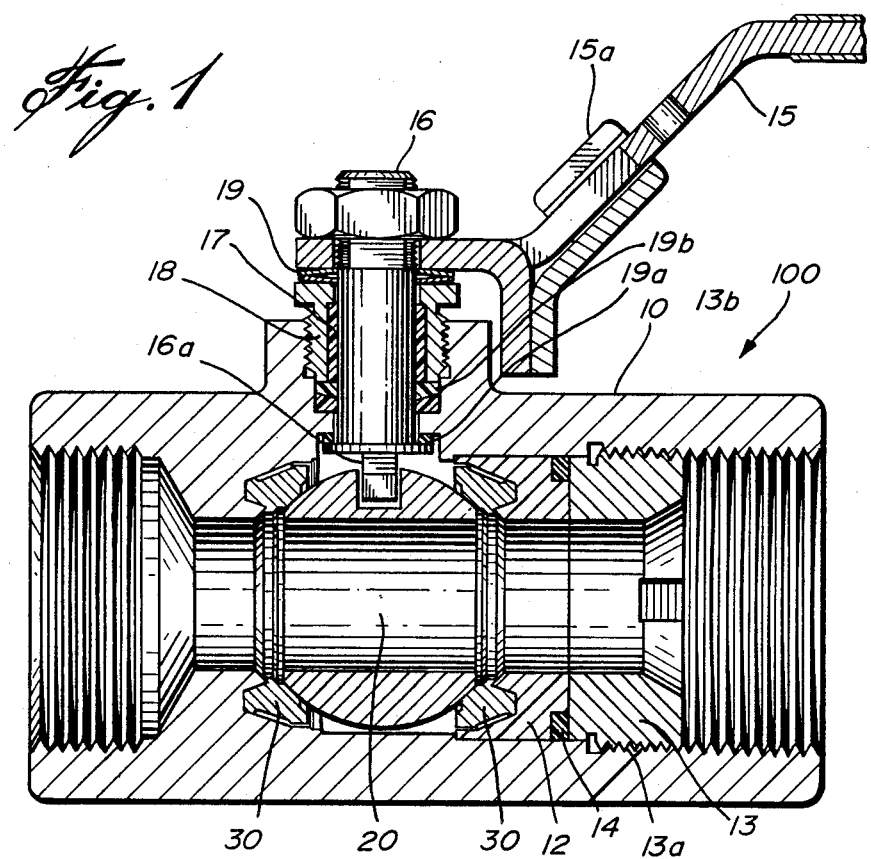
FIG. 1 is a sectional view taken through a ball-type valve and showing therein a seal-seat in accordance with the present invention.
Figure 2:
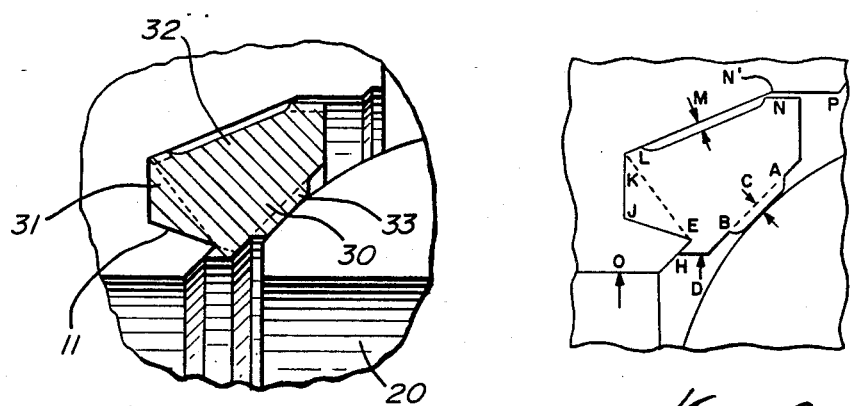
FIG. 2 is an enlarged cross-sectional view of the seal-seat as shown in FIG. 1.

Referring in detail to the drawings, FIG. 1 shows in part a ball valve 100 having a valve body 10; a ball 20 and a pair of seal-seats 30. Seal-seat 30 comprises a first working portion 31 adapted so as to be received within a cavity 11 of the valve body 10, thus to mount seal-seat 30 and a second working portion 32, which as may be clearly seen from FIGS. 1 and 2, extends in cantilever fashion from first portion 31 and which is adapted to sealingly engage ball 20. Thus, during assembly of valve 100 to restrict fluid flow therethrough when the valve is in closed position, first portion 31 is subjected to compression forces, i.e., forces applied by ball 20 and second working portion 32 is subjected to tensile forces, also being forces applied by ball 20. In the case of FIG. 2 embodiment, the second portion includes the lip defined by surfaces E, H and D seen more clearly in FIG. 3.

Ball valve 100 is of well known construction and may also for example, be as shown and described in applicant's U.S. Pat. No. 3,384,341 dated May 21, 1968, except that it is adapted to receive and secure therein seal-seats 30.

Referring to FIG. 1, valve 100 is seen to comprise, apart from body 10 and ball 20, a seat retainer 12 held in place by a seal retainer nut 13 which compresses against body seal 14. As seen, seal retainer nut 13 is used to move ball 20 against seals 30. Thus, the relative movement between seal retainer nut 13 and body 10, applies a selected compression and tension to seals 30, adjustment thereof being achieved by rotation of seal retainer nut 13 within body 10 via screw threads 13a aided by tool slot 13b. The adjustment of course may be made when the valve is in either a valve open or valve closed position, such positions being controlled via handle 15 which rotates shaft 16 and accordingly ball shaft turning means 16a. As seen, shaft 16 is mounted by a bearing 17 secured in body 10 via threaded bushing 18, shaft 16 being urged outwardly of body 10 by spring washers 19 to compress seal 19a and packings 19b, thus to prevent leakage of fluid past shaft 16. The threads 13a may be arranged such that seal retainer nut 13 cannot be overtightened and cause damage to seal-seats 30 or compress and tension seal-seats 30 beyond a desirable amount.

Figure 3:
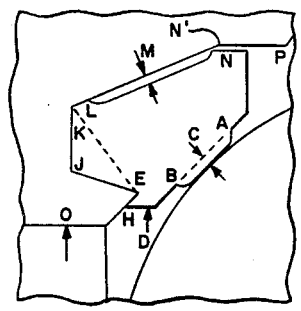
FIG. 3 is a view similar to that of FIG. 2 but emphasizing the contour of the seal seat.

With reference to seal-seats 30, in the embodiments shown in FIGS. 1 and 2, valve body 10 includes aforementioned cavity 11 comprising a plurality of planar surfaces which are angularly disposed one to another and designated as seen in FIG. 3, EJ, JK, LN' and P. Cavity 11 thus conforms to the outer shape of portion 31 and part of portion 32 of seal-seat 30. As also seen, cavity 11 terminates at a point E provided by apexed planar surfaces EJ and EH, acknowledging surface EH may in some embodiments, extend in varying angularity to surface EJ, also that the shape of cavity 11 may vary from embodiment to embodiment depending upon requirements and designs.

Seal-seat 30 may comprise any suitable material including glass and metal impregnated Nylon* and/or Torlon*, the impregnations including in ratios of 15–30% of the Nylon/Torlon materials, which has been found to perform satisfactorily. It will be appreciated the types of material used for seal-seat 30 may vary depending upon operating conditions to be met, also will vary with advances made in materials' technology.

*Trade Marks of E. I. du Pont de Nemours Company

Seal-seat 30 as seen from FIG. 2 or 3, for example, showing such in cross-section, has an irregular outer shape. This irregular shape however is of particular importance, as will be appreciated from the specification hereinafter. FIG. 2, for example, discloses one particular outer shape of seal-seat 30, though, it will be understood various other outer shapes may also be utilized, provided their behaviour when in operation is similar to that of the said one preferred embodiment. In other words, the outer shape of seal-seat 30 may be modified for example, to that shown in FIG. 2 by dotted line, where no major behavioural change occurs during operation. The outer shape must be such that a portion corresponding to first portion 31 is provided, which will enter into a cavity corresponding to cavity 11 and compress during valve assembly operation and a second portion corresponding to second portion 32 is provided which is cantilevered off the first portion 31 and which will tension during valve assembly operation. The lip defined by surfaces EH and HD shown in FIG. 3, along with annular protuberance 33, a wear ring portion, are preferred features. Protuberance 33 after a number of valve closing cycles, depending on material used, etc., takes up the contour of the ball 20 to aid the sealing operation. As further seen from FIG. 2, a space M is provided to permit second portion 32 to deflect toward valve body 10 upon application of ball 20 thereto and thus allow second portion 32 to become tensioned.

Seal-seat 30 as further seen from FIG. 2, extends elongatedly and circumferentially of ball 20, the degree of extension being a matter of choice, taking into account the tensile characteristics of the material utilized for the seal-seat, the pressure applied by the ball 20 and other factors. Also seen in FIG. 2, for example, second portion 32 extends in a tongue-like configuration, its thickness tapering toward the free end thereof.

Thus, as best seen from FIG. 2 one preferred embodiment of seal-seat outer peripheral shape is characterized by (when in operative position) the second portion 32 extending circumferentially of the ball periphery; the second portion 32 including an annular protuberance extending inwardly of the seal to sealingly engage the ball 20; the first portion 31 having a plurality of peripheral faces angularly disposed at more than 90° one to another, whereby there is formed an apex-shaped ridge and together with the second portion 32, an apex-shaped groove thereon, this groove defining an angle of less than 90°; and wherein the first portion 31 includes a further peripheral face angularly disposed respective said other peripheral face at more than 90°, to thereby provide an additional apex-shaped ridge thereon, the second portion 32 comprises an elongated tongue-like configuration, the thickness thereof tapering toward the free end thereof; the free end of the tongue-like configuration comprising a pair of perhiperal faces angularly disposed at 90° one to another and providing a further apex-shaped ridge thereon; one of the pair of faces adjacent the said free end extends to terminate at an adjoining peripheral face angularly disposed at more than 90° thereto and adapted to face the ball 20 and extend tangentially of the surface thereof and one of the pair of faces adjacent the said free end extends to terminate at an adjoining peripheral face having its major portion extending linearly in spaced relation to the valve body.

Operation of ball valve 100 with its seal-seats 30 will now be briefly described. FIG. 1 shows ball valve 100 in valve open position. To close fluid flow through ball valve 100, ball 20 is simply rotated upon its axis through an arc of 90° by rotating handle 15 until it engages stop 15a. During the rotational movement, ball 20 remains in constant pressure engagement with seal-seats 30 via protuberances 33. As afore-explained, the constant pressure exerted on ball 20 and valve body 10 by seal-seats 30 stems from the tightening of seal retainer nut 13 upon assembly of the valve as a result ball 20 applies pressure to seal-seat 30 causing first portion 31 to compress within cavity 11 and second portion 32 to deflect, producing tensile forces within second portion 32. The tensile forces in effect apply seal-seat 30 tightly against ball 20 via annular protuberance 33, and reaction to force first annular portion 31 tightly within annular cavity 11, thereby providing a tight seal condition between ball 20 and valve body 10. As will be appreciated, in the seal-tight condition, the apex-shaped groove of seal-seat 30 clampingly engages the apex-shaped ridge formed by the surfaces HE and EJ, thereby aiding the sealing operation. The aforementioned compressive and tensile forces provide what may be termed "a sealing memory" since they exert a continuous sealing pressure against the ball 20 and valve body 10, automatically compensating for wear. A further characterizing feature of the present seal-seat is that it comprises a basically static part, i.e., the aforementioned first portion 31 and a basically dynamic part i.e., the aforementioned second portion 32 which is bendable and spring-like.

I claim:

1. An annular seal-seat for use in a high pressure valve having a valve body and a ball, said seal-seat comprising a first working portion adapted to be received with a cavity defined by walls of the valve body for use in mounting the seal-seat, said first working portion comprising a plurality of peripherally extending cavity wall engaging faces, angularly disposed one to another to define a faceted nose portion having thereon a pair of apex-shaped ridges and an apex-shaped groove, and a second working portion extending in cantilever fashion radially outwardly from said first portion and adapted to sealingly engage the ball whereby during the assembly of the valve to restrict fluid flow therethrough when the valve is in a closed position, said first portion is subjected to compression forces and said second portion is subjected to tensile forces.

2. A seal-seat as defined in claim 1, wherein said second portion is adapted to extend circumferentially of the ball, when in operative position.

3. A seal-seat as defined in claim 2, wherein said second portion includes an annular protuberance thereon adapted to engage said ball.

4. A seal-seat as defined in claim 1, wherein said second portion, when viewed in cross-section, comprises an elongated tongue-like configuration, its thickness tapering toward the free end thereof.

5. A seal-seat as defined in claim 4, wherein said free end comprises a pair of peripheral faces angularly disposed one to another and providing a further apex-shaped ridge thereon.

6. A seal-seat as defined in claim 5, wherein the angular disposition of said pair of peripheral faces measures 90°.

7. A seal-seat as defined in claim 5, wherein one of said pair of faces, adjacent said free end, extends to terminate at an adjoining peripheral face angularly disposed thereto and adapted to face toward the ball, when in operative position.

8. A seal-seat as defined in claim 1, wherein the angular disposition of said peripheral faces one to another forming said apex-shaped ridges exceeds 90°.

9. A seal-seat as defined in claim 1, wherein the angular disposition of said peripheral faces one to another forming said apex-shaped groove measures less than 90°.

10. A seal-seat as defined in claim 9, wherein the angular disposition between said one of said pair of faces and said adjoining peripheral face measures in excess of 90°.

11. A seal-seat as defined in claim 10, wherein said adjoining peripheral face extends tangentially respective the ball, when in operative position.

12. A seal-seat as defined in claim 11, including an annular protuberance on said adjoining peripheral face adapted to sealingly engage with the ball, when in operative position.

13. A seal-seat as defined in claim 5, wherein one of said pair of faces adjacent said free end extends to terminate at an adjoining peripheral face, the latter face having its major portion extending linearly and in spaced relation to the valve body, when in operative position.

14. A seal-seat as defined in claim 1, including said valve body and ball.

15. A seal-seat as defined in claim 1, wherein said first and second portions comprise glass and metal impregnated teflon.

16. A seal-seat as defined in claim 15, wherein said impregnations comprise 15-30% of the Nylon material.

17. A seal-seat as defined in claim 1, wherein said first and second portions comprise glass and metal impregnated Torlon.

18. A seal-seat as defined in claim 17, wherein said impregnations comprise 15-30% of the Torlon material.

* * * * *